(12) United States Patent
Shaffer et al.

(10) Patent No.: US 6,785,867 B2
(45) Date of Patent: Aug. 31, 2004

(54) AUTOMATIC APPLICATION LOADING FOR E-MAIL ATTACHMENTS

(75) Inventors: Shmuel Shaffer, Palo Alto, CA (US); William J. Beyda, Cupertino, CA (US); Paul Bonomo, San Jose, CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 08/956,010

(22) Filed: Oct. 22, 1997

(65) Prior Publication Data

US 2002/0059347 A1 May 16, 2002

(51) Int. Cl.[7] .............................................. G06F 17/00
(52) U.S. Cl. ...................... 715/516; 715/515; 715/526; 709/206
(58) Field of Search ................................ 709/206, 318, 709/320; 707/515, 516; 715/515, 516, 526

(56) References Cited

U.S. PATENT DOCUMENTS

| | | | |
|---|---|---|---|
| 5,377,354 A | | 12/1994 | Scannell et al. ............ 395/650 |
| 5,555,346 A | | 9/1996 | Gross et al. ................. 706/45 |
| 5,608,874 A | | 3/1997 | Ogawa et al. ......... 395/200.15 |
| 5,613,108 A | | 3/1997 | Morikawa .................... 393/616 |
| 5,734,901 A | * | 3/1998 | Sidhu et al. ................. 395/680 |
| 5,781,901 A | * | 7/1998 | Kuzma ........................... 707/10 |
| 5,805,811 A | * | 9/1998 | Pratt et al. .............. 395/200.36 |
| 5,818,447 A | * | 10/1998 | Wolf et al. .................... 345/335 |
| 5,826,023 A | * | 10/1998 | Hall et al. .............. 395/200.36 |
| 5,826,062 A | * | 10/1998 | Fake, Jr. et al. ............. 395/500 |
| 6,405,225 B1 | * | 6/2002 | Apfel et al. ................. 715/526 |

FOREIGN PATENT DOCUMENTS

| | | |
|---|---|---|
| CA | 2192237 | 5/1997 |
| EP | 0 886 228 A2 | 12/1998 |
| WO | WO 98/15925 | 4/1998 |
| WO | WO 99/01818 | 1/1999 |

OTHER PUBLICATIONS

IBM TDB "Protecting Against Infection by Computer Viruses", Hereinafter IBM TDB, vol. 33,No. 2, Jul. 1, 1990, pp. 318–320.*
Morgan, Developing For Netscape ONE, QUE Corp., pp. 246–247, and 276–277, Jan. 1997.*
Microsoft Windows NT Screen Pumps Microsoft Corporation Fig. 1.3, 1996.*
British Patent Office Examination Report Dated Mar. 1, 2002.

* cited by examiner

Primary Examiner—Sanjiv Shah
Assistant Examiner—Cesar B Paula (57) ABSTRACT

A system and method for automatically loading an application program associated with an e-mail application attachment file upon reception of the e-mail. Alternatively, the application program may be loaded as soon as the e-mail message itself is opened, without waiting for the user to click on the attachment icon. In either case, the application program is loaded in a minimized state such that as soon as the user clicks on the attachment icon, the attachment application file may be run without waiting for the relatively lengthy time required to load the application program. Prior to loading the application program, responsive to receiving the e-mail message, the computer (102, 114) may examine system resources to determine whether memory (208) usage is sufficient to allow for the opening of the application program.

20 Claims, 6 Drawing Sheets

FIG. 1

| Sender | Rec'r | Message Name | Attach.name |

AUTOMATIC APPLICATION LOADING FOR E-MAIL ATTACHMENTS

BACKGROUND OF THE INVENTION

1. Field of the Invention

The present invention relates to computer systems and more particularly, to application loading within computer systems having electronic mail (e-mail) capabilities.

2. Description of the Related Art

Private and public electronic mail systems are becoming increasingly commonplace. Electronic mail or e-mail application programs provide only a limited text editor which allow, for example, only the use of Courier fonts and without sophisticated word processing or graphics capabilities. In order to send sophisticated word processed or other types of documents, one or more applications may be attached to the e-mail message file. Such application attachment files cannot themselves be read by the e-mail application program. Instead, special or external application programs must be used to read or open the files. For example, word processing documents in Microsoft Word or Wordperfect word processing program format, Adobe Acrobat program compatible image files, and JPEG or MPEG image files may be sent as attachments to an electronic mail message.

Typically, the mail message is received and a "clickable" icon is created to denote the attachment application file. When the user "clicks" on the icon for the attachment application file, the application corresponding to the attachment application file is loaded. For example, if the document is a word processing document in Microsoft Word 95 word processing program format, clicking on the attachment icon causes the operating system, such as Windows 95 or Windows NT operating system program, to load Microsoft Word word processing program. Once Microsoft Word word processing program has been loaded, the Word program loads and opens the attachment application file.

This process is disadvantageous, however, in that the computer requires several seconds to load the application program prior to loading the attachment application file. For example, a 200 MHZ Pentium Processor running WINDOWS 95 may take approximately 5 seconds to load WORD 95 prior to loading the attachment WORD document. Accordingly, the user wastes time while the computer performs the loading task.

Accordingly, there is a need for an improved system and method for loading application programs used to read electronic mail attachment application files. There is a still further need for a system and method for enhancing the e-mail process.

SUMMARY OF THE INVENTION

These and other disadvantages of the prior art are overcome in large part by a system and method according to the present invention. In particular, the present invention automatically loads an application program associated with an e-mail application attachment file upon reception of the e-mail. Alternatively, the application program may be loaded as soon as the e-mail message itself is opened, without waiting for the user to click on the attachment icon. In either case, the application program is loaded in a minimized state such that as soon as the user clicks on the attachment icon, the attachment application file may be run without waiting for the relatively lengthy time required to load the application program. Prior to loading the application program, responsive to receiving the e-mail message, the computer may examine system resources to determine whether memory usage is sufficient to allow for the opening of the application program.

A method according to the present invention includes receiving an e-mail message having an attachment application file. The processor examines the attachment file for a unique suffix. The suffixes may, for example, be .DOC (representative of, e.g., a Microsoft Word word processing program document), .PDF (representative of, e.g., a portable document format file), .JPG (representative of a Joint Picture Exhibition Group file), and the like. Each such suffix may be associated with an application program. The processor compares the suffix provided on the attachment application file with a predetermined table of suffixes associated with application programs. If a match is found between a suffix of the attachments application file, the corresponding application program will be opened and loaded in a minimized state. Then, when the user clicks on the attachment icon, the attachment application file may itself be opened immediately rather than having to wait for loading of the application program.

BRIEF DESCRIPTION OF THE DRAWINGS

A better understanding of the present invention is obtained when the following detailed description is considered in conjunction with the following drawings in which.

DETAILED DESCRIPTION OF THE INVENTION

Figure 1:
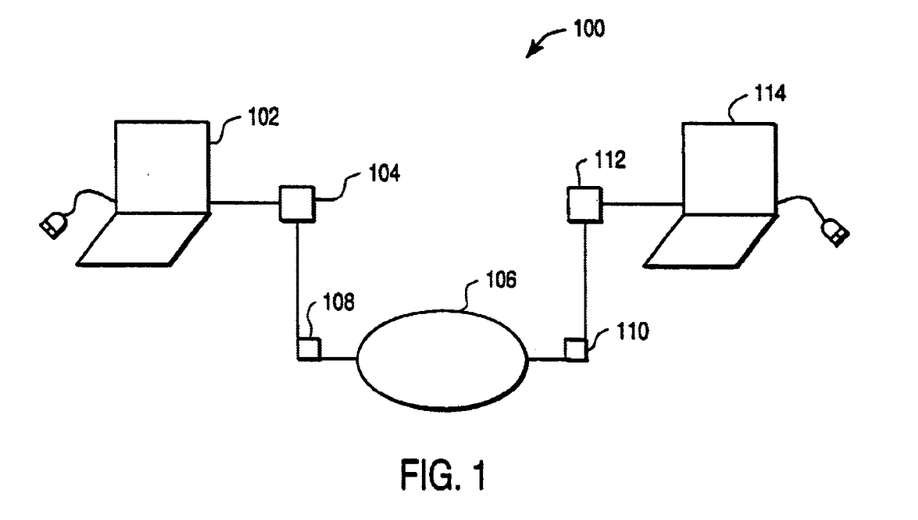
FIG. 1 is a diagram illustrating a computer system having e-mail capabilities connected to a network according to an embodiment of the present invention.

Turning now to the drawings, and with particular attention to FIG. 1, a computer system 100 according to an embodiment of the present invention is illustrated. The computer system 100 includes a computer 102 coupled via a modem 104 to a mail server 108 which may be connected to a network 106, such as the public switched telephone network (PSTN). The public switched telephone network 106, in turn, may be coupled to another mail server 110, another modem 112 and another computer 114. The mail servers 108, 110 may, for example, be servers provided by an Internet service provider. Thus, the computers 102, 114 may belong to individual users having Internet service accounts with their respective Internet service providers. The modems 104, 112 thus may be analog modems or ISDN terminal adaptors and the like. Further, the modems 104, 112 may be internal or external modems, or PC Card modems.

It is noted, however, that different configurations are possible. For example, either or both of the computers 102, 114 may be one of a plurality of computers in a local area network (LAN); alternatively, the computers 102, 114 may be servers within such a local area network. Similarly, the network 106 may be any of a variety of public or private networks. The computers 102, 114 may be laptop, palmtop or desktop computers; and may be connected to the network via land lines or remote links, such as radio or infrared. Further, while a mail server is illustrated in association with each computer, the computers may be part of the same network and hence share a single mail server. Thus, FIG. 1 is exemplary only.

As is well understood, the computers 102, 114 may be configured to run a variety of application programs including e-mail programs, word processing programs, spreadsheet programs, graphic programs, and the like. The e-mail program may be configured to permit attachment of external documents. For example, the e-mail program may be the e-mail program provided with web browsers such as NETSCAPE NAVIGATOR or MICROSOFT EXPLORER; or may be an e-mail program which runs independently of a web browser, such as EUDORA E-MAIL or E-MAIL CONNECTION.

As will be discussed in greater detail below, a portion of the disk drive 214 (FIG. 2) may be used to store a table 213 containing attachment file suffixes and their associated application files. When the e-mail application is running, the table may be loaded into the RAM 208 for faster access.

Figure 2:
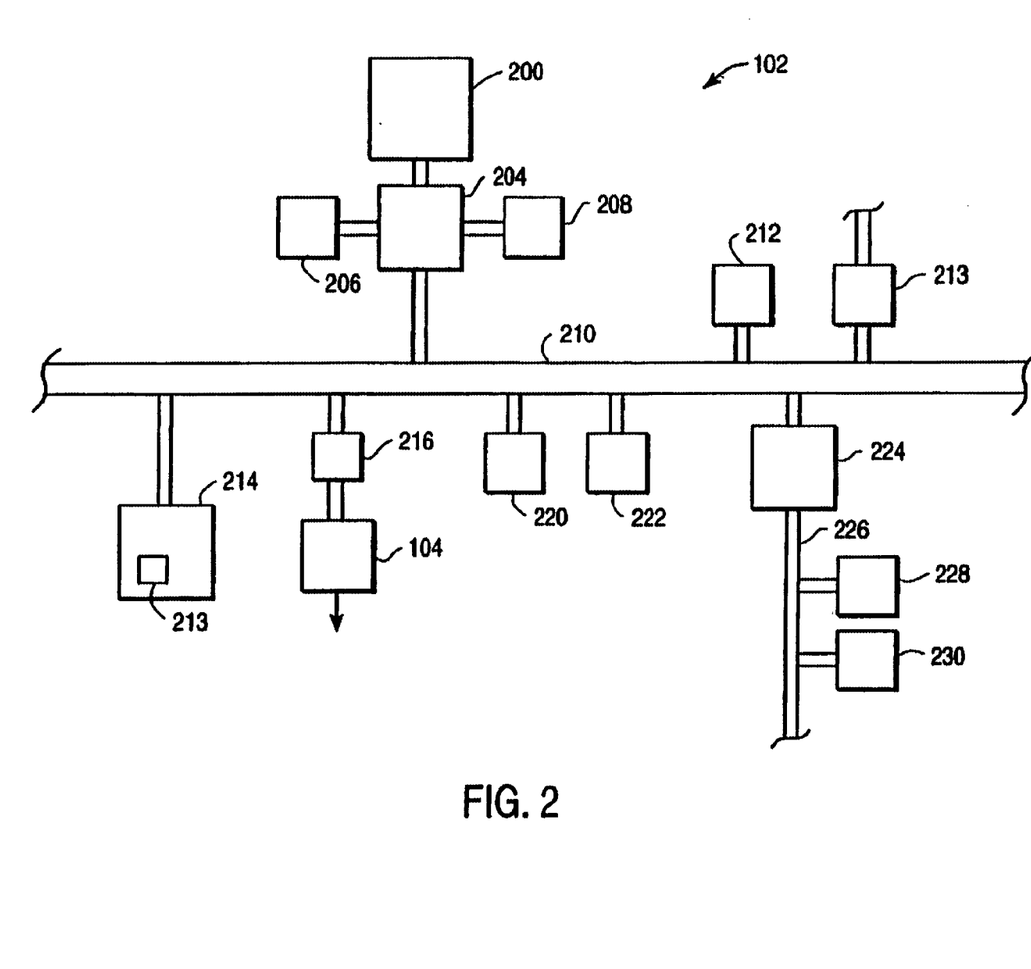
FIG. 2 is a block diagram illustrating a computer having automatic application loading according to an embodiment of the present invention.

An exemplary computer such as the computers 102, 114 is illustrated in block diagram format in FIG. 2. The computer 102 or 114 includes one or more CPUs (Central Processing Unit) 200. The CPU 200 may be any of a variety of commonly available processors such as X86 compatible processors, including Pentium or Pentium II type or compatible processors. The CPU 200 is coupled to a bus bridge 204 which, in turn is coupled to a random access memory (RAM) 209, as well as to a read only memory 206. The bus bridge 204 may include memory controllers (not shown) as well as cache memory (not shown) for faster memory accesses. The bus bridge 204 also provides an interface to an expansion bus 210. The expansion bus 210 may be a PCI (Peripheral Component Interconnect) bus. Alternatively, the expansion bus 210 may be a bus compatible with the extended industry standard architecture (EISA), the industry standard architecture (ISA) or the micro-channel architecture (MCA). A variety of peripheral devices may be coupled to the expansion bus 210. In particular, a disk drive 214, a CD ROM drive 121, a video card 200, and an audio card 222 may be coupled to the expansion bus 210. A LAN interface 213, for coupling the computer to a LAN, may also be provided. In addition, a variety of serial and parallel ports (not shown) may be provided for external input/output capabilities, such as via a mouse or other cursor pointing device. In addition, a PC Card interface 216 may be coupled to the expansion bus 210. The PC Card interface 216, in turn, couples to a PC Card, such as a PC Card modem 104. An additional bus bridge 224 for coupling to a secondary expansion bus 226, may further be coupled to the expansion bus 210. Additional peripheral devices 228, 230 may be coupled to the secondary expansion bus 226. The secondary expansion bus 226 may be an ISA, EISA or MCA expansion bus.

Turning back to FIG. 1, a user of the computer 102 may compose an e-mail message using his e-mail application program and attach a separate document to the e-mail message in a manner that is well understood in the art. For example, the e-mail message may be composed and stored in RAM 208; the attachment application file, typically stored in disk drive 214, is "attached" to the message. It is noted that the attachment application file may be stored on a remote disk drive, for example, on a LAN server, and accessible via LAN interface 213. The e-mail message is then transmitted via the modem 104 to an associated mail server 108. The mail server 108 in turn provides the message across the network 106 to a destination mail server 110. The destination mail server 110 then provides the message to the user of the computer 114 via a modem 112.

Figure 3:
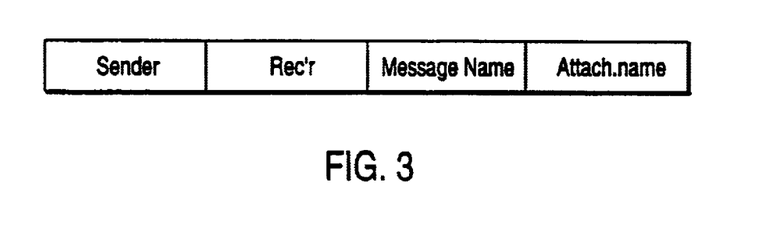
FIG. 3 is a diagram of an exemplary message header according to an embodiment of the present invention.

The user of the computer 114 downloads the message containing the attachment application file from the mail server 110. At this point, according to the present invention, one of several things may happen. According to a first embodiment of the invention, the CPU 200 running the e-mail application program may check the received e-mail to determine whether or not an attachment file has been sent along with the e-mail. This may be accomplished, for example, through the conventional process whereby the e-mail application program informs the user that the received e-mail message has an attachment associated therewith. For example, a machine-readable header may be provided to notify the system than an attachment application file is being provided, as well as identifying both the attachment file name and the e-mail message itself. Such a header is illustrated in FIG. 3. Although the format of such information may vary from system to system, basic header information includes the sender identification, the recipient address, the message name, and the attachment name, including the attachment suffix, if any. The e-mail message and the attachment application file may be stored at a predetermined location of the disk drive 214 (FIG. 2). The e-mail message is stored according to a predetermined name; the attachment application file is stored under the name provided with the identifying header.

Next, the CPU 200 running the e-mail application program may analyze the received application attachment file for a suffix. If such a suffix is provided, the program then will compare the application attachment file suffix with the stored table 213 of application document suffixes. As discussed above, the table or data base downloaded to RAM 208 contains a list, for example, of unique document suffixes and programs associated therewith. For example, the suffix .DOC may be associated with a MICROSOFT WORD 95 word processing program document. The suffix .PDF may be associated with an ADOBE ACROBAT READER program application. Similarly, a suffix .JPG may be associated with any of a variety of graphic reader application programs. The suffix may be read either directly from the header or from the file name after it has been installed. If a match is found, the CPU 200 running the e-mail application program will cause the corresponding application program to be opened (i.e., begin running and downloading to RAM from the hard drive). The application program begins running in a minimized condition. Then, when the user accesses the e-mail message and clicks, for example, on the attachment icon, the application program is released from the minimized condition and automatically opens the attachment application file.

In an alternate embodiment, the CPU 200 does not perform the compare operation until after the user accesses the e-mail message. Reception of the e-mail message with application attachment file causes the CPU 200 running the e-mail application program to store the e-mail message in the standard folder or queue, for example, on disk drive 214. The user may access the e-mail message, for example, by clicking on an icon or other indicia of the presence of the e-mail message. According to this embodiment of the invention, clicking or accessing the message causes the CPU 200 running the e-mail application program to analyze the message to determine whether or not an attachment file exists and if so, whether an application program is associated therewith. For example, while the user is reading the message and the attachment icon is being displayed for the user, the CPU 200 running the e-mail application program may read the application attachment file suffix of the application attachment file, which has been stored as generally discussed above. The e-mail program will then compare the attachment suffix to the stored table of suffixes and associated application programs. If the CPU 200 determines that a corresponding application program exists, the corresponding application program is activated to run in a minimized condition. Then, when the user clicks or selects the attachment icon, the application program is de-minimized and the attachment application file is opened immediately by the application program without having to wait for the application program to load.

Finally, in either embodiment, prior to loading the application program associated with an application attachment file, the CPU 200 may check memory (e.g., RAM 208) to determine whether or not sufficient memory exists to permit the application program to run in the minimized or maximized condition. If insufficient memory exists, a warning or error message may appear on the screen notifying the user that he or she should close some applications. For example, it is possible that several e-mail messages may arrive as a batch, each having attachments related to a different application program. According to the present invention, the application programs may be opened sequentially (i.e., in the order in which they are received), or in any predetermined order (such as according to a use priority or identification), but only after a memory check determines that sufficient memory exists to run each application.

Figure 4:
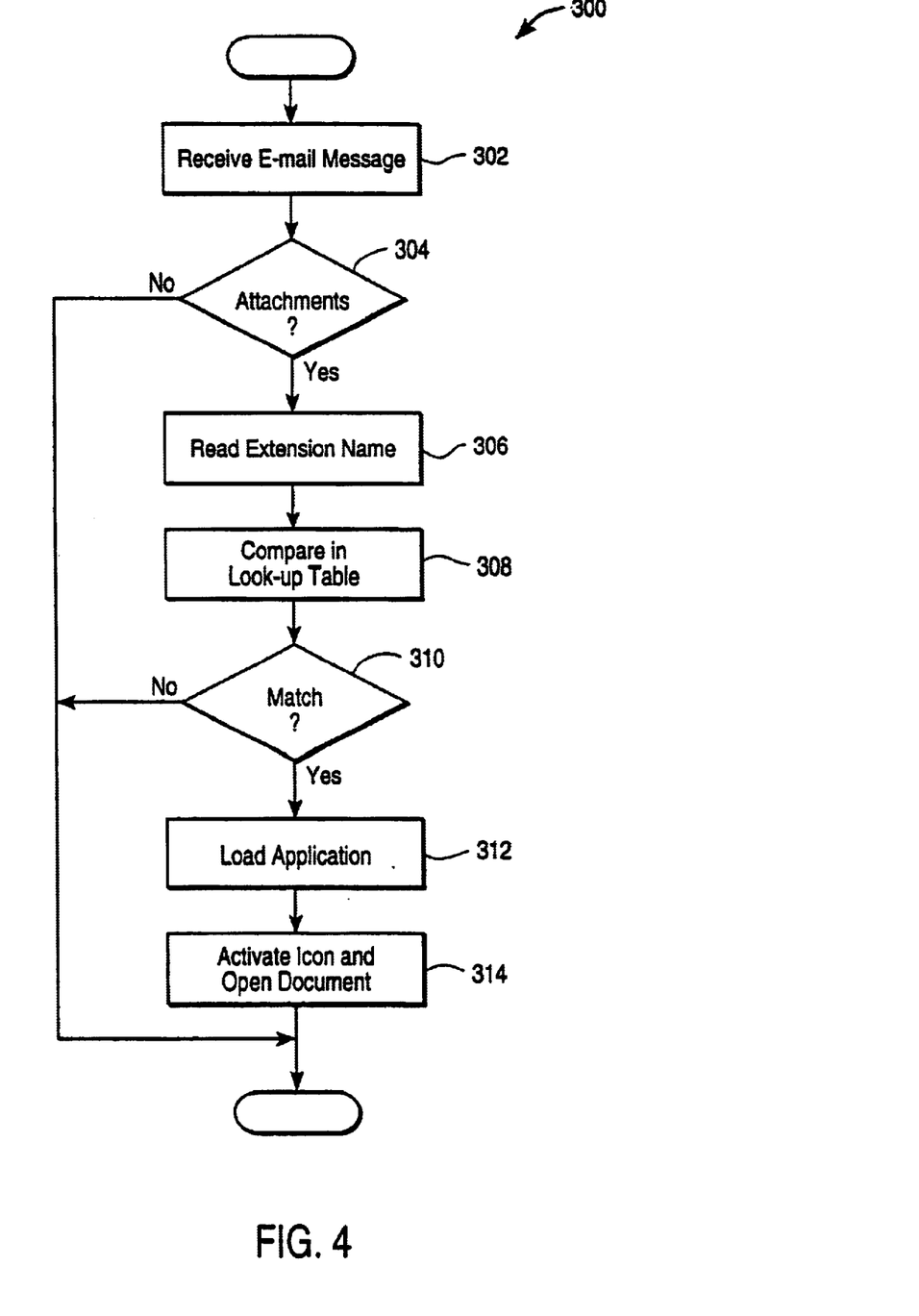
FIG. 4 is a flow chart illustrating operation of an embodiment of the present invention.

Turning now to FIG. 4, a flow chart 300 is shown depicting a method for automatic application loading according to an embodiment of the present invention. In a step 302, a computer 114 receives an e-mail message from another computer such as the computer 102. As discussed above, receiving the e-mail message includes receiving header information including a sender identification, a recipient address, a message name and an attachment name, if any. In a step 304, the CPU 200 of the receiving computer 114 reads the header to determine whether or not an attachment has been provided with the e-mail message. If such an attachment has been provided, the attachment is stored by the CPU 200 to a folder or other memory location in the disk drive 214. The processor 200 then reads the extension name in a step 306. It is noted that the CPU 200 may read the extension name from the attachment application file name provided in the header, or alternatively, may read the extension name after the attachment application file has been stored to the disk drive. In a step 308, the CPU 200 compares the attachment suffix with the table 213 of attachment suffix/application associations that were previously stored on the disk drive 214 and were downloaded to RAM 208 upon loading the e-mail program. In a step 310, the CPU 200 determines whether the suffix or extension is associated with an existing application program. If so, then in a step 312 the CPU 200 will cause the application program to be loaded from the disk drive 214 into the RAM 208. As discussed above, the application program may be loaded to run in a minimized condition. Finally, in a step 314, when the user activates the attachment icon, the application program is de-minimized and the application attachment file is opened.

Figure 5:
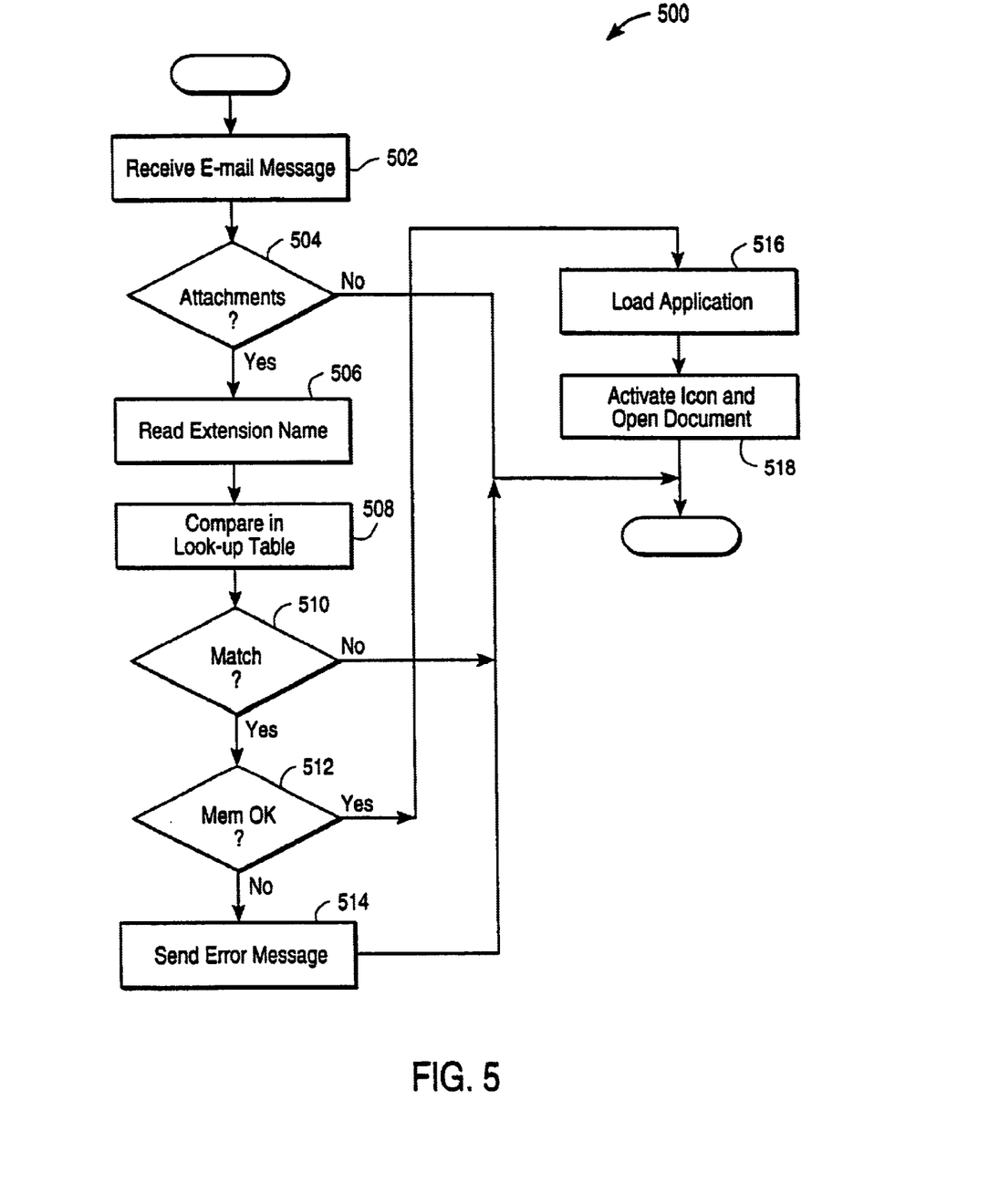
FIG. 5 is a flow chart illustrating operation of an embodiment of the present invention.

Turning now to FIG. 5, a flow chart 500 is shown depicting a method for automatic application loading according to an alternate embodiment of the present invention. In a step 502, a computer 114 receives an e-mail message from another computer such as the computer 102. As discussed above, receiving the e-mail message includes receiving header information including a sender identification, a recipient address, a message name and an attachment name, if any. In a step 504, the CPU 200 of the receiving computer 114 reads the header to determine whether or not an attachment has been provided with the e-mail message. If such an attachment has been provided, the attachment is stored by the CPU 200 to a folder or other memory location in the disk drive 214. The processor 200 then reads the extension name in a step 506. It is noted that the CPU 200 may read the extension name from the attachment application file name provided in the header, or alternatively, may read the extension name after the attachment application file has been stored to the disk drive. In a step 508, the CPU 200 compares the attachment suffix with the table 213 of attachment suffix/application associations that were previously stored on the disk drive 214 and were downloaded to RAM 208 upon loading the e-mail program. In a step 510, the CPU 200 determines whether the suffix or extension is associated with an existing application program. If so, then in a step 512 the CPU 200 will perform a memory check to determine whether sufficient memory exists to run the associated application program. If not, the application program will not be opened, and an error or warning message will be sent in a step 514. Otherwise, however, in a step 516, the CPU 200 will cause the application program to be loaded from the disk drive 214 into the RAM 208. As discussed above, the application may be loaded to run in a minimized condition. Finally, in a step 518, when the user activates the attachment icon, the application program is de-minimized and the application attachment file is opened.

Figure 6:
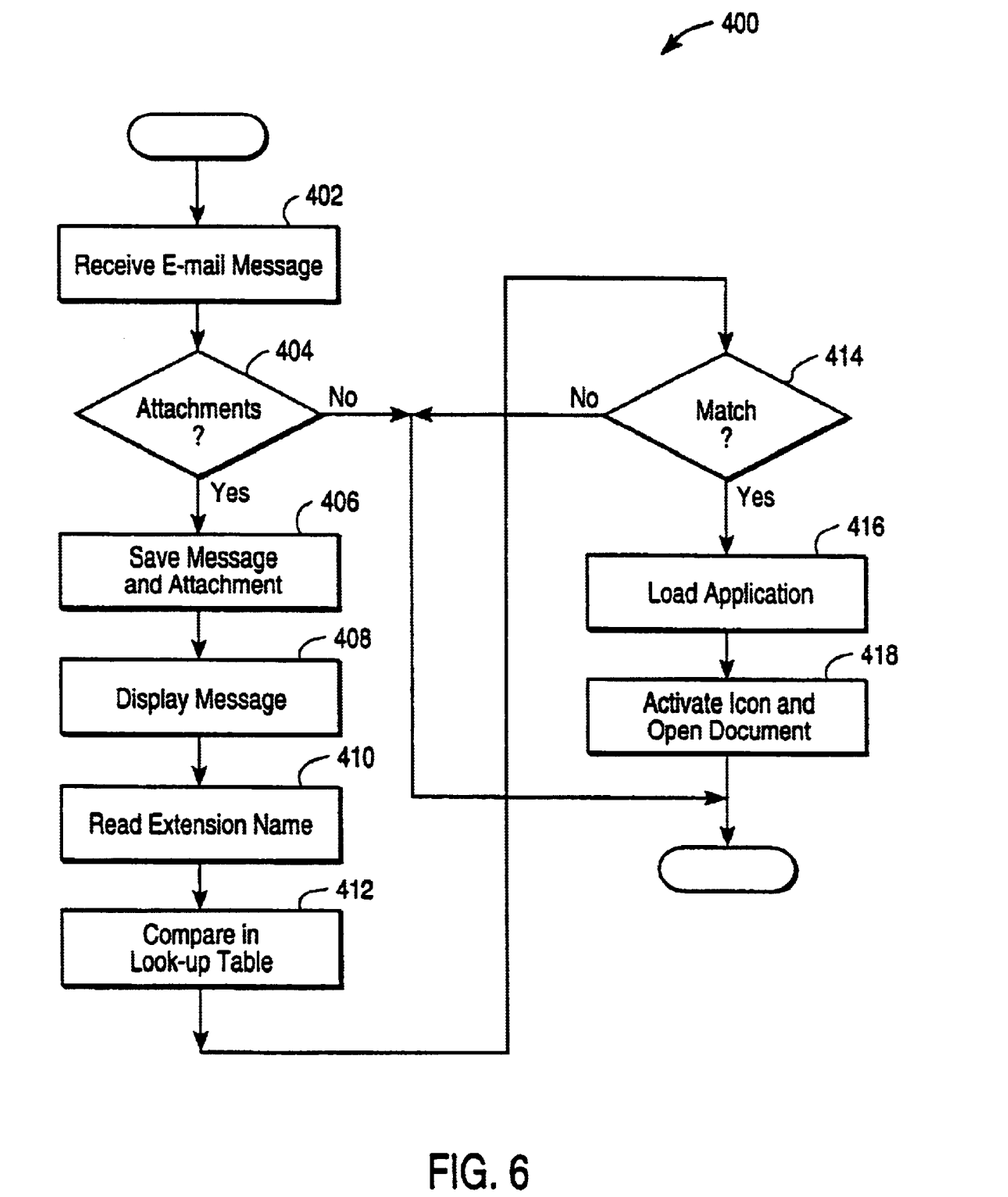
FIG. 6 is a flow chart illustrating operation of another embodiment of the present invention.

Turning now to FIG. 6, a flow chart 400 illustrating operation of another method for automatic application loading according to the present invention is shown. In a step 402, a recipient computer such as computer 114 receives an e-mail from a sending computer, such as the computer 102. As discussed above, the received e-mail message includes header information including identification of an attachment file, if any. The CPU 200 of the receiving computer 114 reads the header and determines whether or not an attachment file has been provided in a step 404. In step 406, the CPU 200 running the e-mail application program, saves the attachment file, if any, as well as the message file. The message file is displayed either automatically or in response to user input such as by clicking on a mouse key in a step 408. In response to displaying the message, the CPU 200 reads the attachment application file's extension or suffix in a step 410. In a step 412, the CPU 200 accesses the look-up table from RAM 208 in order to determine whether there exists a corresponding application program in a step 412. If, in a step 414, the CPU 200 determines that such a match exists, then in a step 416 the application program is loaded from the disk drive 214 into RAM 208 to run in a minimized state. In a step 418, in response to user activation of the attachment file icon, the application program is de-minimized and the attachment application file is opened. It is noted that in this embodiment the application program may not complete its loading prior to the user activating the application file icon. However, even in this embodiment, beginning loading the application program in response to reading the e-mail message will minimize the amount of wait time acquired to open the attachment application file.

Figure 7:
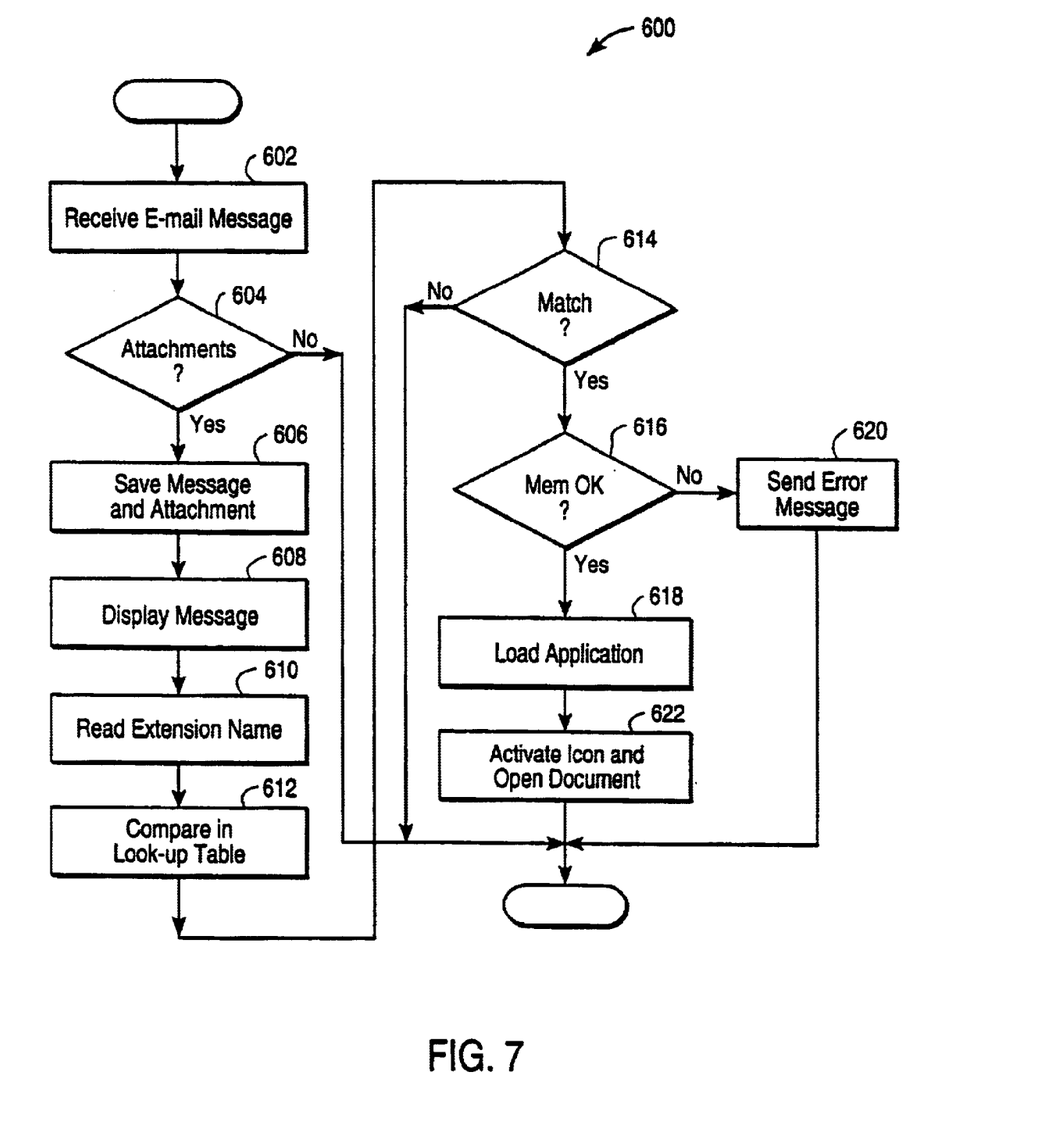
FIG. 7 is a flow chart illustrating operation of another embodiment of the present invention.

Turning now to FIG. 7, a flow chart 600 illustrating operation of another method for automatic application loading according to the present invention is shown. In a step 602, a recipient computer such as computer 114 receives an e-mail from a sending computer, such as the computer 102. As discussed above, the received e-mail message includes header information including identification of an attachment file, if any. The CPU 200 of the receiving computer 114 reads the header and determines whether or not an attachment file has been provided in a step 604. In a step 606, the CPU 200 running the e-mail application program, saves the attachment file, if any, as well as the message file. The message file is displayed either automatically or in response to user input such as by clicking on a mouse key in a step 608. In response to displaying the message, the CPU 200 reads the attachment application file's extension or suffix in a step 610. In a step 612, the CPU 200 accesses the look-up table from RAM 208 in order to determine whether there exists a corresponding application program. If, in a step 614, the CPU 200 determines that such a match exists, then in a step 616 the CPU determines whether or not sufficient memory exists to run the application program. If not, the application program is not opened and an error or warning message is displayed in a step 620. However, if sufficient memory exists, the application program is loaded from the disk drive 214 into RAM 208 to run in a minimized state in a step 618. In a step 22, in response to user activation of the attachment file icon, the application program is de-minimized and the attachment application file is opened.

The invention described in the above detailed description is not intended to be limited to the specific form set forth herein but, on the contrary, it is intended to cover such alternatives, modifications and equivalents as can reasonably be included within the spirit and scope of the appended claims.

What is claimed is:

1. A computer system which includes a RAM memory configured to run application programs, said computer system comprising:

means for receiving at least one electronic mail message, said receiving means including means for receiving at said computer system at least one attachment application file associated with said at least one electronic mail message, said at least one attachment application file being of a type of file from a plurality of file type;

means for detecting said type of at least one attachment application file; and means for automatically identifying at least one application program resident on said computer system, said at least one application program being of said type as a detected attachment application file and automatically copying said application to said RAM memory responsive to said identifying means prior to a user selecting said attachment file, said application program being launched in a minimized state, wherein a loading time when said user selects said attachment file is minimized.

2. A computer system as recited in claim 1, said receiving means including means for transferring said at least one electronic mail message from a mail server to a user terminal.

3. A computer system as recited in claim 2, wherein said identifying and copying means includes an operating system program associated with said user terminal.

4. A computer system as recited in claim 3, wherein said identifying and copying means includes means for comparing a file name extension of said at least one attachment application file with a predetermined file name extension database.

5. A computer system as recited in claim 4, wherein said predetermined file name extension database stores at least one extension associated with said at least one application program.

6. A computer system as recited in claim 5, wherein said comparing means and said file name extension database are comprised in a mail server.

7. A computer system as recited in claim 5, wherein said comparing means and said file name extension database are comprised in said user terminal.

8. A computer system as recited in claim 1, wherein said at least one application program is a word processing application program.

9. A computer system as recited in claim 8, wherein said at least one application program is a graphical viewer application program.

10. A computer system as recited in claim 1, wherein said copying means includes means for checking memory usage prior to copying said at least one application program.

11. A method for running application programs in a computer system which includes a RAM memory, comprising:

receiving at least one electronic mail message, said receiving including receiving at least one attachment application file associated with said at least one electronic mail message, wherein said attachment application file and said electronic mail message are received at said computer system, said at least one attachment application file being of a type of file from a plurality of file types;

detecting said type of at least one attachment application file;

automatically identifying at least one application program resident on said computer system, said at least one application program being of said type as a detected attachment application file, and automatically copying said application program to said RAM memory and launching said application program in a minimized state responsive to said identifying prior to a user selecting said attachment file, wherein a loading time when said user selects said attachment file is minimized.

12. A method as recited in claim 11, said receiving including transferring said at least one electronic mail message from a mail server to a user terminal.

13. A method as recited in claim 12, wherein said identifying includes comparing a file name extension of said at least one attachment application file with a predetermined file name extension database.

14. A method as recited in claim 13, further including said predetermined file name extension database storing at least one extension associated with said at least one application program.

15. A method as recited in claim 11, wherein said copying includes checking memory usage prior to copying said at least one application program.

16. A computer system which includes a RAM memory configured to run application programs, said computer system comprising:

means for receiving at least one electronic mail message, said receiving means including means for receiving at said computer system at least one attachment application file associated with said at least one electronic mail message, said at least one attachment application file being of a type of file from a plurality of file types;

means for detecting said type of at least one attachment application file, said detecting means analyzing a file name extension of said at least one attachment application file; and means for automatically identifying at least one application program resident on said computer system, said at least one application program being of said type as a detected attachment application file and automatically copying said application to said RAM memory responsive to said identifying means prior to a user selecting said attachment file, said application program being launched in a minimized state, wherein a loading time when said user selects said attachment file is minimized.

17. A computer system as recited in claim 16, said receiving means including means for transferring said at least one electronic mail message from a mail server to a user terminal.

18. A computer system as recited in claim 17, wherein said identifying and copying means includes an operating system program associated with said user terminal.

19. A computer system as recited in claim 18, wherein said identifying and copying means includes means for comparing said file name extension of said at last one attachment application file with a predetermined file name extension database.

20. A computer system as recited in claim 19, wherein said predetermined file name extension database stores at least one extension associated with said at least one application program.

* * * * *